United States Patent [19]
Lasoen

[11] 4,286,669
[45] Sep. 1, 1981

[54] DRAFT SENSING APPARATUS

[75] Inventor: Jean J. Lasoen, Ville Preux, France

[73] Assignee: Massey-Ferguson Services N.V., Curacao, Netherlands Antilles

[21] Appl. No.: 41,976

[22] Filed: May 24, 1979

[30] Foreign Application Priority Data

May 30, 1978 [GB] United Kingdom .............. 24606/78

[51] Int. Cl.³ ............................................ A01B 63/112
[52] U.S. Cl. .................................. 172/7; 280/446 A
[58] Field of Search ................... 280/446 R, 446 A; 172/7, 8, 9, 10; 73/141 A; 74/569

[56] References Cited

U.S. PATENT DOCUMENTS

| | | | |
|---|---|---|---|
| 916,702 | 3/1909 | Hartt | 74/569 |
| 3,754,473 | 8/1973 | Massey | 74/569 |
| 3,812,916 | 5/1974 | Lasoen | 172/7 |
| 3,869,001 | 3/1975 | Mueller | 172/7 |
| 3,888,315 | 6/1975 | Elfes et al. | 280/446 A |
| 4,142,733 | 3/1979 | Berini | 280/446 A |

Primary Examiner—John A. Pekar
Attorney, Agent, or Firm—John C. Thompson

[57] ABSTRACT

A tractor draft sensing apparatus in which an elongated sensing shaft is supported in spaced fulcrum supports and carries a pair of draft links on its end portions located outward of the supports. Draft force signals are provided by an elongate member which is attached at one end to the shaft, extends generally parallel to the shaft, and carries at its other end a follower which engages a cam and pivots the cam to give a signal proportional to shaft bending and hence to the draft forces applied to the shaft. The elongate member also carries a separate follower which engages a guide surface on a guidance member to ensure that the elongate member moves relative to the shaft generally in a horizontal plane only during shaft bending. The shaft may also be shaped so that its neutral axis between the fulcrum supports is displaced transversely of the shaft, generally in the direction of application of the draft force, relative to its neutral axis location within the supports.

13 Claims, 11 Drawing Figures

DRAFT SENSING APPARATUS

BACKGROUND OF THE INVENTION

This invention relates to draft sensing apparatus for tractors.

Tractor draft sensing apparatus are already known which include an elongated shaft having support portions for mounting in spaced fulcrum supports and end portions positioned axially outward of said support portions for mounting a pair of draft members, the arrangement being such that draft forces imposed on the shaft by the draft members cause the shaft to bend, and sensing means are arranged to produce a draft signal proportional to the amount of bending of the shaft. One example of such a system is described in U.S. Pat. No. 3,888,315.

Two problems may be experienced with draft sensing apparatus of the above type. Firstly, the apparatus may have an appreciable amount of internal friction, for example in the fulcrum supports and sensing means, resulting in the apparatus exhibiting considerable hysteresis which tends to make the apparatus imprecise in its response to changes in draft loads. Secondly, the shaft may be subjected to extremely high draft forces which may cause the tensile bending stresses induced in the shaft to approach the elastic limit of the shaft material even when the shaft is heat treated.

It is an object of the present invention to provide a tractor draft sensing apparatus which at least alleviates one or both of the above problems.

SUMMARY OF THE INVENTION

According to the present invention there is provided a tractor draft sensing apparatus including an elongated shaft having support portions for mounting in spaced fulcrum supports and end portions positioned axially outward of said support portions to receive a pair of draft members for imposing draft forces on the shaft as a result of which the shaft bends, an elongate member attached at one end to the shaft and arranged to extend generally parallel thereto, a pivotally mounted cam member, a cam follower carried by the other end of the elongate member, a guidance member provided with a guide surface, and a separate guide surface follower carried by the other end of the elongate member for engagement with the guide surface, the arrangement being such that bending of the shaft results in said other end of the elongate member moving relative to the shaft generally in a single plane under the control of the guide surface and the guide surface follower causing the cam follower to pivot the cam by an amount proportional to the draft forces imposed on the shaft.

Since it is changes in the generally horizontal draft forces that are useful indicators to control the vertical position of the draft members in order to maintain a substantially constant draft load, it is desirable to eliminate the effect of the vertical components of the forces applied to the shaft by the draft members. This can be conveniently achieved by orientating the guidance member so that the relative movement between the elongate member and shaft is confined to a substantially horizontal plane. This ensures that the signal given by apparatus is primarily derived from the draft forces.

By providing a separate cam follower and guidance surface follower the internal friction of the apparatus is significantly reduced since if, for example, both followers are separate rollers rotatably mounted on the elongate member it is possible for each roller to maintain rolling contact with its associated cam member or guide surface and thus eliminate sliding friction which would occur at certain times if a single follower on the elongate member was arranged to engage both the cam member and guide surface.

Preferably the guidance member is carried on the shaft and carries the pivotal mounting for the cam member.

Preferably also the pivotal mounting of the cam member is provided by pin means of an appreciably smaller diameter than the transverse dimensions of the shaft. This reduces the frictional resistance to the pivotting of the cam.

The invention also provides a tractor draft sensing apparatus including an elongated shaft having support portions for mounting in spaced fulcrum supports and end portions positioned axially outward of said support portions for mounting a pair of draft members, the arrangement being such that draft forces imposed on the shaft by the draft members cause the shaft to bend, sensing means arranged to produce a draft signal proportional to the amount of bending of the shaft, the shaft being shaped so that, considering the shaft in an unloaded condition, the neutral axis of the shaft between the support portions is displaced transversely of the general direction of elongation of the shaft relative to the neutral axes of the support portions, said displacement being generally in the direction in which the draft forces are applied to the shaft.

Two main benefits stem from the above displaced neutral axis arrangement.

Firstly, it enables the apparatus to be more precise in its response to changes in draft forces by reducing the effects of the moments of the frictional forces which arise in the fulcrum supports during bending of the shaft. Secondly, it enables a cross-sectional shape to be adopted for the portion of the shaft with the displaced neutral axis which results in a reduced level of tensile stress in the outer surface layers of the shaft during bending. Further explanation as to how these two benefits arise is given below.

The cross-section of said portion of the shaft with the displaced neutral axis may be symmetrical about a single plane containing the neutral axis of said portion.

In a preferred construction the portion of the shaft with the displaced neutral axis has the cross-sectional shape of a major segment of a circle.

In the various draft sensing apparatus arrangements described above each end portion of the sensing shaft may extend through a ball member which is received in a complimentary shaped socket member carried by the associated draft member, the axially outward movement of each ball member relative to its respective end portion being limited to prevent fouling of the ball member, socket or draft member on any adjacent structure of the tractor.

In one construction the axially outward movement of each respective ball member is limited by an annular sleeve which is arranged to hold an abutment ring in an annular groove in the respective end portion, the abutment ring being split chordally and providing an abutment surface for contact by the respective ball member to limit said axially outward movement.

The degree of bending to which the shaft can be subjected may be limited by arranging an abutment member on each shaft and end portion to extend axially within a bore in an adjacent movement limiting member, the amount of clearance between the abutment member and bore serving to limit the degree of bending possible.

BRIEF DESCRIPTION OF THE DRAWINGS

One embodiment of the present invention will now be described, by way of example only, with reference to the accompanying drawings in which.

DESCRIPTION OF A PREFERRED EMBODIMENT

Figure 1:
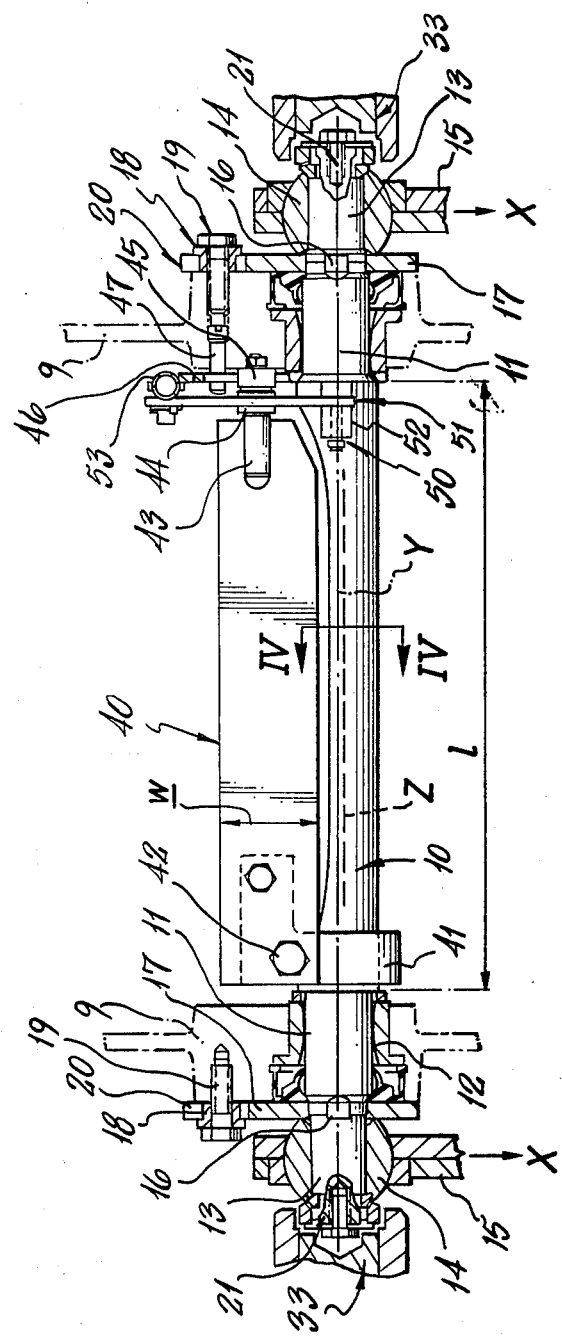
FIG. 1 is a plan view, partly in section of a draft sensing apparatus embodying the present invention.
Figure 2:
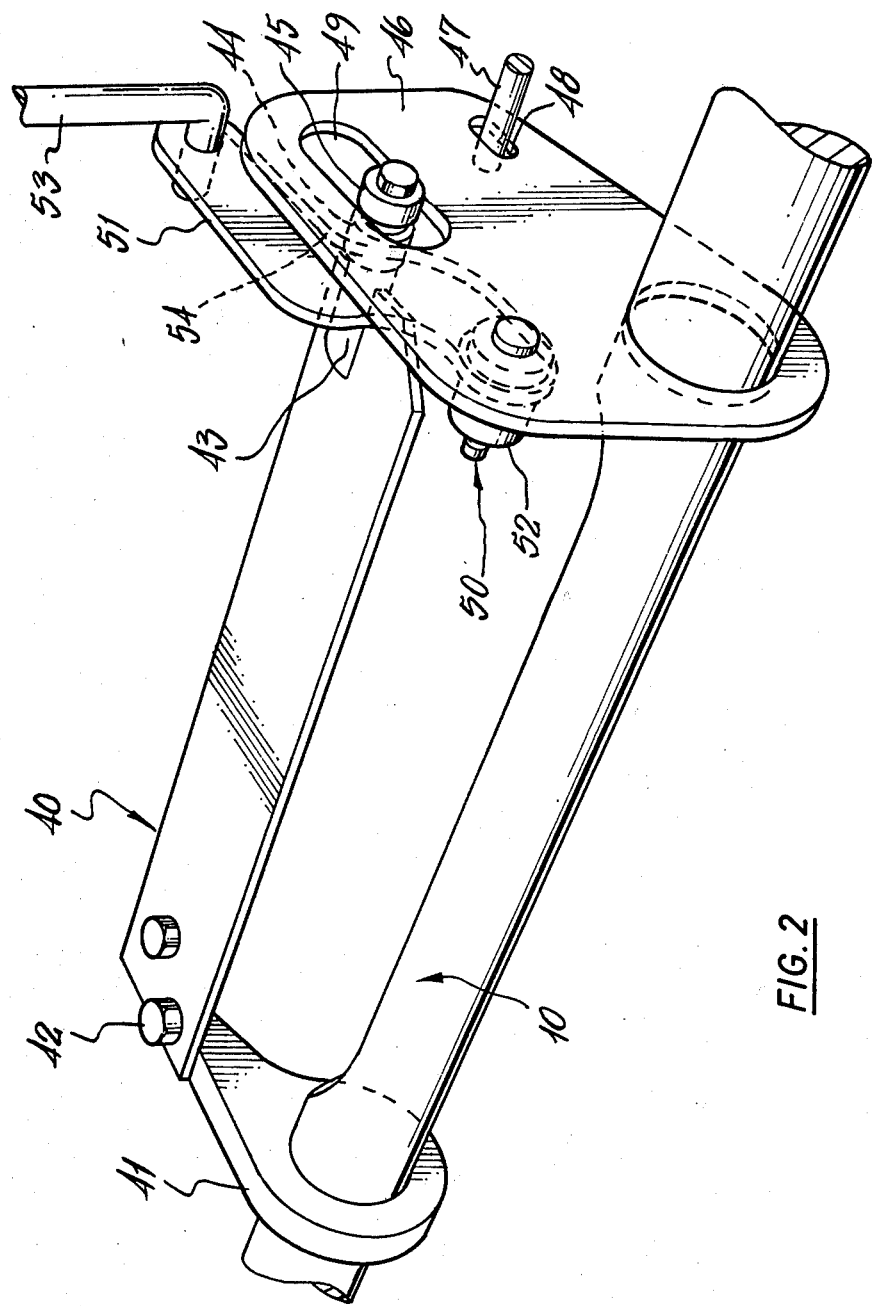
FIG. 2 is a diagrammatic perspective view on an increased scale of part of the apparatus of FIG. 1.

Referring to FIGS. 1 and 2 the draft sensing apparatus comprises an elongate shaft 10 having support portions 11 which are mounted in fulcrum supports 12 which are carried by parts 9 of the rear axle housing of the tractor. The shaft 10 also has end portions 13 which receive ball members 14 on which draft members in the form of lower links 15 are supported. The lower links are arranged to apply draft forces to the shaft 10 as indicated by the arrows X in FIG. 1.

The shaft 10 is made fom a steel with a high ultimate tensile strength (e.g. an AISI 4150–4155 steel with an ultimate tensile strength of 180,000 p.s.i. minimum) and the shaft is heat treated to further improve its mechanical properties. In particular, the support and end portions of the shaft are hardened.

In a typical example the total length of the shaft 10 is 21.5 inches and the distance l of FIG. 1 between the support portions is approximately 12 inches.

The shaft 10 is provided with flats 16 intermediate the support and end portions. These flats are engaged by plates 17 which are held against rotation relative to the rear axle housing parts 9 by bushes 18 carried on bolts 19. The bushes extend through slots 20 in the plates thus holding the plates 17 and also the shaft 10 against rotation relative to the rear axle housing parts 13.

Figure 3:
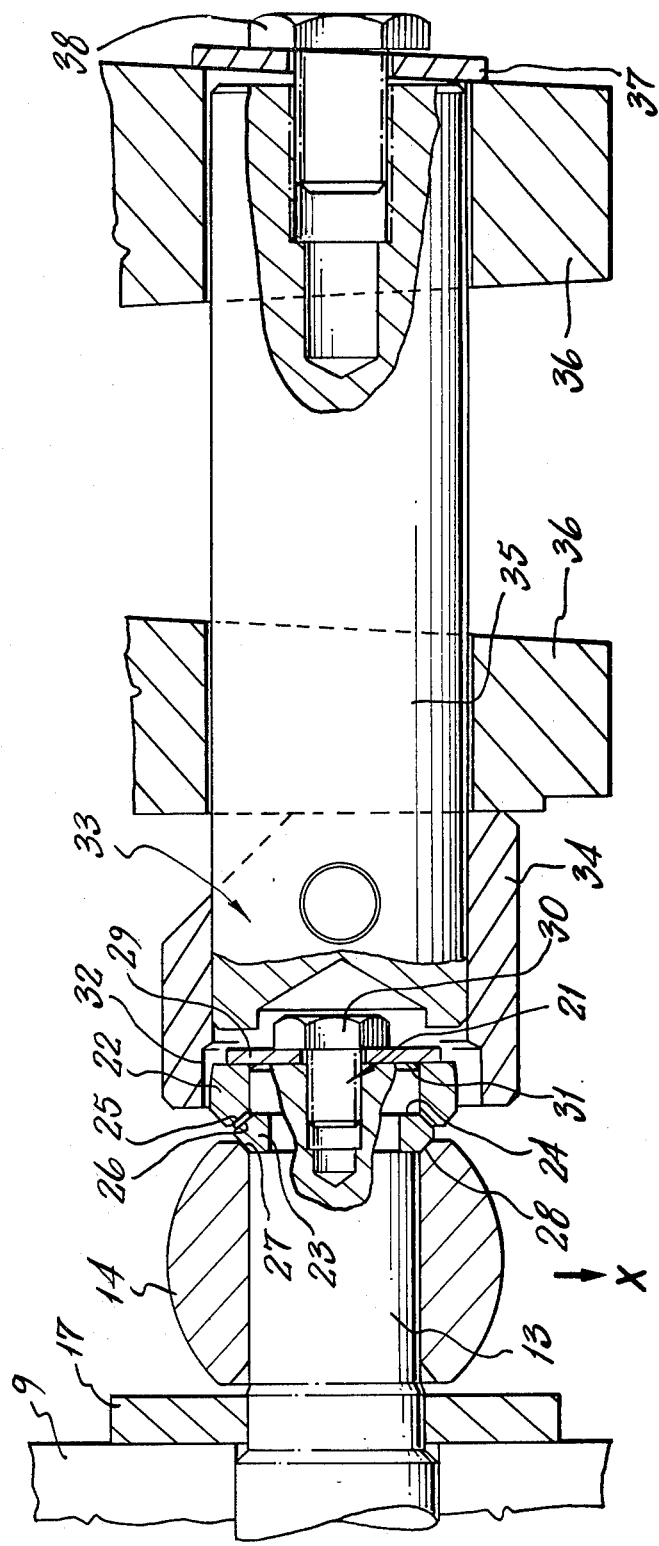
FIG. 3 is a part sectional view on an increased scale of one end portion of the sensing shaft of the apparatus of FIG. 1.

The ball members 14 are located against axially outward movement relative to the shaft 10 by the fastening arrangement 21 shown in greater detail in FIG. 3. This arrangement comprises a sleeve 22 which is arranged to hold a two piece abutment ring in an annular groove 24 in the respective end portion 13 of the shaft. The ring 23 is split diametrically being retained in the groove 24 by an inclined surface 25 on the sleeve 22 which contacts a corresponding inclined surface 26 on the ring 23. The ring also provides an inclined abutment surface 27 which contacts a corresponding abutment surface 28 on the ball member to prevent axially outward movement of the ball member.

The sleeve 22 is held in position against the ring 23 by a washer 29 carried on a bolt 30 which is screwed into the end face 31 of the shaft 10.

As can be seen from FIGS. 1 and 3 the sleeve 22 extends within a bore 32 provided in a movement limiting member 33. As can be seen from FIG. 3 the bore 32 is of larger diameter than the outside diameter of the sleeve 22 and has the effect of limiting the bending which the shaft 10 can be subjected to by the draft links 15.

The movement limiting member 33 comprises a bush member 34 having the bore 32, the bush member being secured to a shaft 35 which is retained in two horizontally extending fork arms 36 provided on the rear axle housing by a washer 37 and bolt 38.

Figure 4:
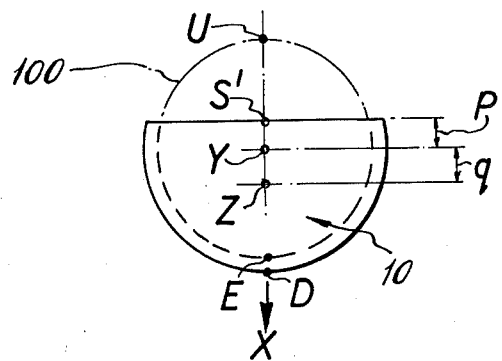
FIG. 4 is a section on the line IV—IV of FIG. 1.

The support portions 11 and end portions 13 of the shaft 10 are of circular cross-section but, as can be seen from FIGS. 1 and 4, the major portion of the length of the shaft between the support portions 11 has the cross-sectional shape of the major segment of a circle of a diameter of 1.62 inches in a typical example. The use of this cross-sectional shape has the important effect of displacing the neutral axis of the shaft between the support portions 11 to the location shown by the dotted line Z in FIG. 1. With a 1.62 diameter section the dimensions p and q of FIG. 4 are typically 0.164 inches and 0.275 inches respectively.

Since the support portions 11 are circular in cross-section their neutral axes lie on the overall longitudinal axis Y of the shaft 10. The neutral axis portion Z is thus displaced transversely relative to the general direction of elongation of the shaft 10 from the neutral axes of the support portions 11. This displacement is generally in the direction in which the draft links 15 load the shaft 10, that is the direction X.

An elongate member in the form of a draft force indicator 40 is secured at one end of the shaft 10 adjacent the left hand support portion 11 as shown in FIG. 1. The draft force indicator is clamped to the shaft 10 by a clamp assembly 41 which is tightened by a bolt 42. The other end of the draft force indicator carries a shaft 43 on which separate rollers 44 and 45 are mounted. These rollers are supported from the shaft 43 by roller bearings. The width w of the indicator 40 is appreciably greater than the width of the indicator used in, for example, the apparatus described in the previously referred to U.S. Pat. No. 3,888,315.

A guidance member for the draft force indicator 40 is provided in the form of a plate 46 shown in FIGS. 1 and 2. This plate is mounted on the shaft 10 and held against rotation by a pin 47 carried by the adjacent axle housing part 13. This pin 47 extends into a slot 48 in the plate 46 thus preventing rotation of the plate.

As can be seen from FIG. 2 the plate 46 includes a larger slot 49 which receives the roller 45. The plate 46 is arranged to be held relative to the housing portion 13 so that the direction of extension of the slot 49 is substantially horizontal. This ensures that the roller 45 which is maintained in contact with one side of the slot can only move generally horizontally relative to the shaft 10.

As can be seen from FIGS. 1 and 2 the plate 46 carries a small diameter pin 50 which forms the pivotal mounting for a cam 51. The cam 51 has a bush 52 which encircles the pin 50 and is connected at its other end with a rod 53 which is connected with the draft control system of the tractor. As can be seen from FIG. 2 the cam 51 has a cam surface 54 which is arranged to be engaged by the roller 44. The cam is biassed against the roller 44 by spring means not shown.

Figure 11:
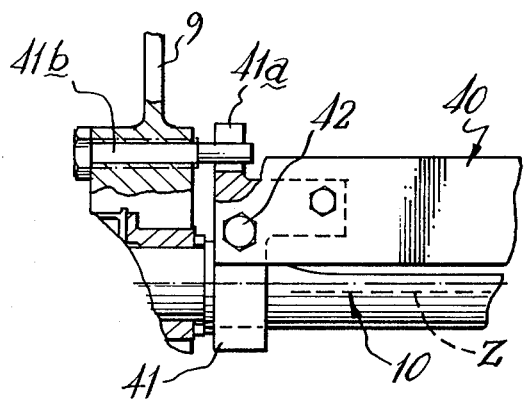
FIG. 11 shows a partially sectioned portion of FIG. 1 with an alternative arrangement for preventing rotation of the sensing shaft.

FIG. 11 shows an alternative arrangement for preventing rotation of shaft 10. In this arrangement the plates 17 and flats 16 are eliminated and the clamp assembly 41 is provided with a horizontally disposed slot 41a which is engaged by a pin 41b screwthreadedly received in the housing 9. The close fit of the pin 41b in the slot 41a prevents rotation of the shaft 10 and the indicator 40. This arrangement has been found more effective at controlling rotation of the shaft 10 and the indicator 40 than the plates 17 and this ensures greater draft signal accuracy.

Figure 5:
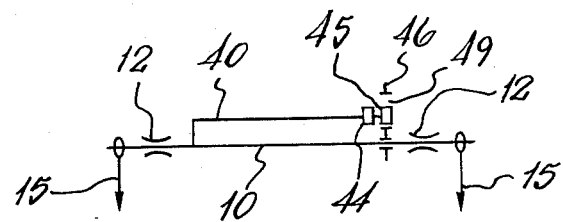
FIG. 5 is a diagrammatic view of the sensing shaft in a zero load condition.
Figure 6:
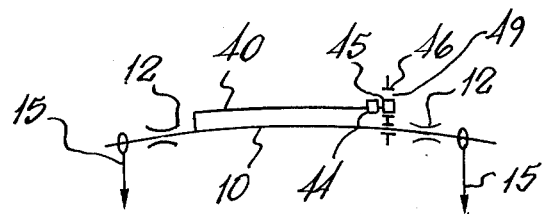
FIG. 6 is a diagrammatic view of the sensing shaft when subjected to vertical forces.

FIG. 5 shows the geometry of the shaft 10 and draft force indicator 40 when the shaft 10 is in an unstressed condition. If the shaft 10 is subjected to vertical forces, as shown diagrammatically in FIG. 6, the shaft 10 assumes a curved configuration together with the draft force indicator 40. The draft force indicator 40 is caused to assume a curved configuration together with the shaft 10 by the action of the slot 49 in the plate 46 and on the roller 45. Thus the roller 44 does not apply any pivotting force to the cam 51.

Figure 7:
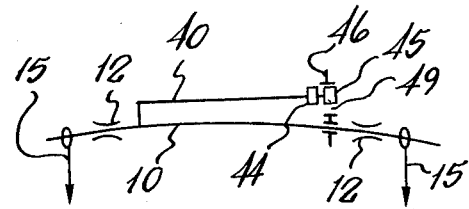
FIG. 7 is a diagrammatic view of the sensing shaft when subjected to horizontal forces.

However, if the shaft 10 is subjected to draft forces, which will be applied in a substantially horizontal plane, the shaft 10 and indicator 40 assume the position shown in FIG. 7. As can be seen from FIG. 7 the indicator 40 remains substantially straight and the free end of the indicator which carries the cam engaging roller 44 moves away from the adjacent portion of the shaft so that the guidance roller 48 moves along the slot 49. Co-operating between the cam surface 54 and the roller 44 thus causes the cam 51 to pivot on the pin 50 thus resulting in vertical movement of the rod 53 which acts as a draft force signal to the draft control system.

The use of the two rollers 44 and 45 described above as compared, for example, with arrangements in which a single roller acts on both the guidance plate and cam significantly reduces the internal friction of the apparatus. This reduction in friction occurs since any single roller trying to engage both the guidance plate slot and the cam profile would at certain times have to slide relative to one or other of these components. By using two rollers it is possible for this sliding friction to be eliminated.

The internal friction within the apparatus is further reduced by the manner in which the cam 51 is mounted on the small diameter pin 50. By mounting the cam in this way the area of contact between the cam and its mounting pin is appreciably reduced compared with arrangements in which, for example, the cam is pivotally mounted on the shaft 10 itself.

The benefits derived from the use of a shaft 10 of the shape described above can be explained as follows.

Figure 8:
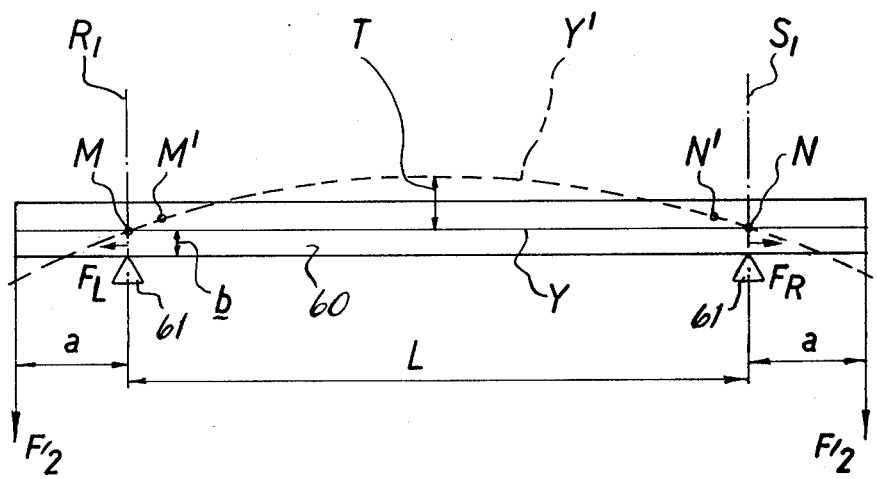
FIG. 8 is a diagrammatic view on a larger scale showing the forces acting on a shaft due to a draft load.

FIG. 8 shows a simplified diagrammatic representation of a sensing shaft 60 and its supports 61, the shaft being shown in full lines in an unstressed condition.

Each end of the shaft is subjected to a draft force of F/2 and the moment arm at each end of the shaft is a, then the moment imposed on each end of the shaft is F/a·a.

In FIG. 8, Y shows the position of the neutral axis when the shaft is unstressed and Y' shows the position occupied by the neutral axis when the shaft is subjected to the total draft load F. If M and N are two points on the neutral axis which lie on perpendiculars R, and S, through the supports 61 when the shaft is unstressed these two points move to say positions M' and N' when the shaft is subjected to the load F.

Considering the left hand support 61 in FIG. 8, the shaft is subjected to a counterclockwise bending moment F/2·a and the frictional contact between the shaft 60 and the left support 61 generates a frictional force $F_L$ which is equal to the normal force (F/2) at the support multiplied by the coefficient of friction $\mu$ (typically 0.23).

This frictional force $F_L$ applies a clockwise moment to the shaft equal at the point of contact to $F_L$·b where b is the perpendicular distance of the contact point of the left support from the neutral axis Y. As will be appreciated, this frictional moment opposes the bending of the shaft.

In a similar manner a frictional force $F_R$ is generated in the right hand support and produces an anticlockwise moment $F_R$·b at the point of contact which opposes the bending of the shaft.

If the loading on the shaft is now reduced so that the points M and N tend to return from positions M' and N' towards their unstressed positions the directions of the frictional forces $F_L$ and $F_R$ are reversed so that the moments supplied by these frictional forces act in the same sense as the draft force moments and oppose the straightening of the shaft.

Thus considering the shaft 60 in a condition in which the total draft force F is increasing, so that the deflection of the shaft 60 is increasing, the deflection T at a given instant is made up of the deflection A due to the end moments of the particular draft force minus the deflection S due to the opposing effect of the above moments of the friction force $F_L$ and $F_R$. That is T=A−S.

If we now consider the draft force F to be decreasing, so that the deflection T is now tending to decrease, the frictional forces and their moments now act in the same sense as the end moments of the draft force so that, assuming the particular draft force to be the same at the instant in question as in the above considered increasing condition, the deflection T=A+S where S is now the increase in deflection due to the assisting effect of the moments of the friction forces.

From the above it can be seen that the draft signal of the apparatus, which is derived from the deflection T, thus has an error or imprecision of ±S due to the effects of the frictional forces $F_L$ and $F_R$.

Experience has shown that when using a sensing shaft 60 which is of uniform circular cross-section the value of S is typically such that a 5% hysteresis effect is produced due to the moments of the frictional forces alone. Thus for a draft load of say 3000 Kg, the effect of the frictional forces in the bearings alone is sufficient to prevent a change in the draft signal unless the draft load increases above 3150 Kg or falls below 2850 Kg.

In order to improve the precision of the apparatus so that the deflection T is more nearly equal to the deflection A which would be achieved in an apparatus with no frictional forces $F_L$ and $F_R$ acting on the support portions of the shaft, it is necessary to try and reduce the value of the deflection S caused by the frictional forces.

The moment of, for example, the friction force $F_L$ at a particular longitudinal position on the shaft 10 can be expressed as $F_L \cdot \delta$ where $\delta$ is the moment arm (i.e. the perpendicular distance from the neutral axis) of the force at the particular position in question.

Figure 9:
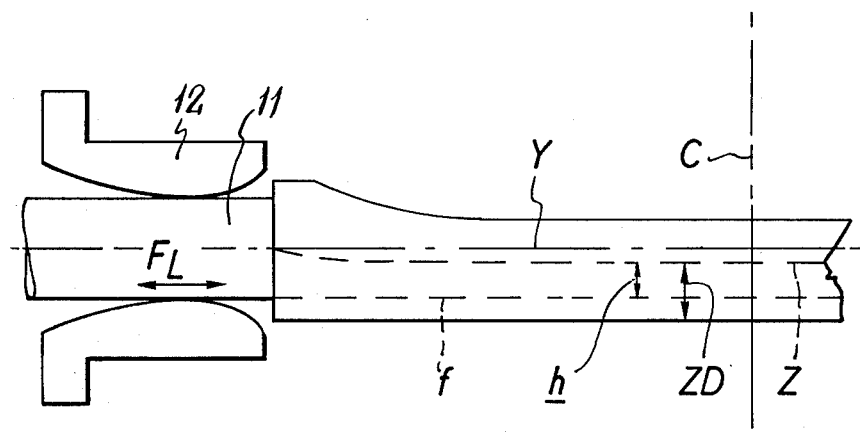
FIGS. 9 and 10 are diagrammatic representations of part of the shaft shown in FIG. 1 on a larger scale showing the shaft part in unstressed and loaded conditions respectively.

This moment arm $\delta$ varies along the length of the shaft. Referring to FIG. 9, considering the shaft 10 in an unstressed state the moment arm of the frictional force $F_L$ at the central plane of the shaft, represented by the chain line C in FIG. 9, is of value h, the force $F_L$ having a line of action F.

As will be appreciated from the discussion of FIG. 4 below the dimension h is less than the dimension ZE in FIG. 4 and is less than the equivalent dimension YD in a shaft of constant circular cross-section with the same second moment of area I.

Figure 10:
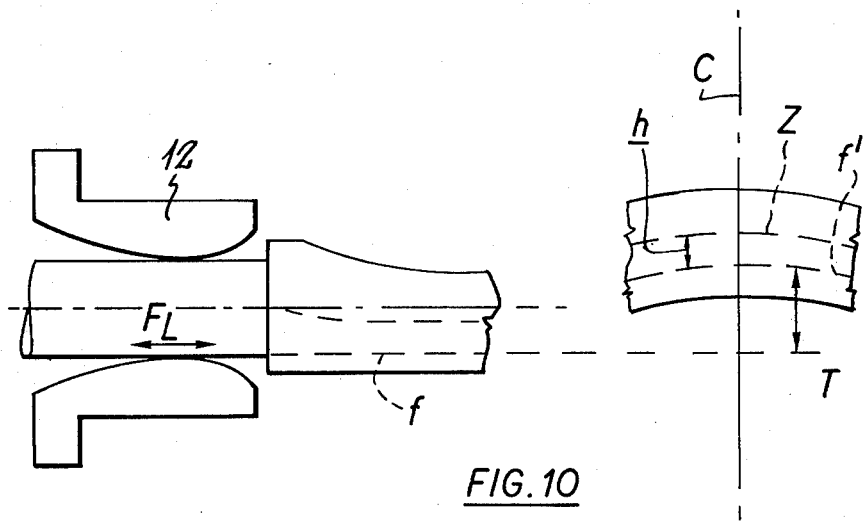

When the shaft 10 is subjected to a draft force F, a deflection (T) of the shaft occurs and the moment arm of the frictional force $F_L$ increases by an amount equal to the deflection T since for example the central portion of the shaft has moved to the location indicated in FIG. 10 and that part of the central portion originally on the line of action f in the unstressed condition now occupies the location f'.

It will be evident from the above that the moment arm $h+T$ of the frictional force $F_L$ is therefore less than the moment arm $YD+T$ which would arise in a shaft of uniform circular cross section having the same second moment of area. Thus by using a shaft with a displaced neutral axis Z the frictional opposition (resulting from the friction forces $F_L$ and $F_R$) to changes in the deflection of the shaft 10 is reduced together with the magnitude of the imprecision or error $\pm S$ of the apparatus.

The above effect is further enhanced by the fact that about 90% of the total deflection of the shaft occurs in the length with the displaced neutral axis and this length of the shaft accounts for approximately 75% of the length of the shaft between the centres of the support portions 11.

In practice it has been found possible to at least halve the imprecision S of the apparatus by using a shaft with a displaced neutral axis.

In addition to reducing the effects of the friction in the shaft supports the use of a displaced neutral axis enables the cross-section of the portion of the shaft between the supports to be shaped so as to reduce the levels of tensile bending stress imposed on the shaft.

If the shaft shown in FIG. 8 is assumed to have a uniform circular cross-section, then the bending stresses (s) in a given fibre of the shaft 60 are given by the well known equation:

$$s = M \cdot y / I$$

where M is the bending moment imposed (i.e. $F/2 \cdot a$ in the present example), y is the distance from the neutral axis of the fibre whose stress is required, and I is the second moment of area of the section.

For the maximum stress condition $y = D/2$ where D is the diameter of the shaft.

Thus if the shape of the shaft is altered to reduce y whilst holding I constant the level of stress can be appreciably reduced. Alternatively, if it is not desired to lower the level of stress, the values of y and I can both be reduced proportionately. This alternative will enable the shaft to produce a larger deflection for a given draft load this being evident from the fact that the deflection T of the shaft (see FIG. 8) is proportional to $ML^2/EI$ where L is the distance between the supports and E is the modulus of the elasticity of the shaft. This formula clearly indicates that the deflection is not proportional to the distance y.

If one refers now to the cross section of the shaft 10 shown in FIG. 4 it will be appreciated that this cross-section will have the same second moment of area I as a smaller diameter circular cross-section shown in FIG. 4 by, for example, the dotted line 100. The distance SZ' from the neutral axis of the bar section 10 to the surface fibre at location S' will be found to be less than the radius YU of the equivalent cross-section 100. Thus if the bar 10 and the equivalent circular cross section 100 are both loaded to the same level in bending, as indicated by the arrow X in FIG. 4, the maximum tensile stress which will occur in the shaft 10 at location S' will be appreciably less than the maximum tensile stress which will occur at the location U in the equivalent circular cross-section 100. In the shaft 10 the second moment of area (I) of the portion of the bar with the displaced neutral axis is arranged to be smaller than the value of I for the support portions 11. Also, the shaft includes a short length 105 immediately inboard of each support portion with a higher I value than the support portions. By arranging the portion of the shaft with the displaced neutral axis to have the lowest I value it is ensured that the highest tensile stresses occur in this portion of the shaft and are reduced as explained above.

In practice we have found that it is possible to achieve stress reductions of up to 40% by using a shaft whose cross-section between the supports is that of a major segment of a circle.

This means that when using a heat treated shaft it is possible to ensure that the tensile stresses which will be developed in the shaft during all operating conditions will at all times remain well within the elastic limit of the shaft. This has not always been the case in previous constructions when it has often been necessary to operate the shaft at levels of tensile stress very close to the elastic limit.

We have found that using the various measures described above to reduce the effects of the internal friction of the draft sensing apparatus is has been possible to reduce the hysteresis of the apparatus by up to 80% if all the measures described above are employed.

When ploughing with a nominal draft load of 3000 Kg the variation in draft load with a correctly operating draft control apparatus is typically within ±10% of the nominal load. Using a draft load sensing apparatus employing all the measures described above in such circumstances it has been found possible to achieve a hysteresis value of approximately ±0.75% so that the apparatus will produce a change in draft signal when the draft load changes by more than say 22.5 Kg.

This is an appreciable improvement over the previous draft sensing apparatus in which the levels of hysteresis have often been so high as to prevent efficient operation of the apparatus.

I claim:

1. A tractor draft sensing apparatus including an elongated shaft having spaced apart support portions for mounting in spaced apart fulcrum supports and end portions positioned axially outward of said support portions to receive a pair of draft members for imposing rearwardly extending draft forces on the shaft as a result of which the shaft bends, an elongate member attached at one end to the shaft and arranged to extend generally parallel thereto, a pivotally mounted cam member, a cam follower carried by the other end of the elongate member for pivoting of the cam member, a guidance member provided with a guide surface, and a separate guide surface follower carried by the other end of the elongate member for engagement with the guide surface to limit relative movement between said other end of the elongate member and the shaft generally to a single plane, whereby on the imposition of draft forces on the shaft said cam follower moves generally in said single plane and pivots the cam by an amount proportional to the draft forces imposed on the shaft.

2. An apparatus according to claim 1 in which the guidance member is carried on the shaft, the cam member being pivotally mounted thereon.

3. An apparatus according to claim 1 in which the pivotal mounting of the cam member is provided by pin means of an appreciably smaller diameter than the transverse dimensions of the shaft.

4. An apparatus according to claim 1 in which the cam follower and guide surface follower comprise separate rollers which are rotatably mounted on the elongate member.

5. An apparatus according to claim 1 in which the guide surface is provided by a side of an elongate slot in the guidance member within which the guide surface follower is arranged to move.

6. An apparatus according to claim 1 in which the shaft is shaped so that, considering the shaft in an unloaded condition, the neutral axis of an intermediate portion of the shaft between the support portions is displaced rearwardly of the centerline of the support portions.

7. An apparatus according to claim 6 in which the cross-section of said intermediate portion of the shaft is symmetrical about a plane defined by the neutral axis of said intermediate portion and the centerline of the support portions.

8. An apparatus according to claim 6 in which said intermediate portion of the shaft has the cross-sectional shape of a major segment of a circle.

9. An apparatus according to claim 1 in which each end portion of the shaft extends through a ball member which is received in a complimentary shaped socket member carried by the associated draft member, the axially outward movement of each ball member relative to its respective end portion being limited to prevent fouling of the ball member, socket or draft member on any adjacent structure of the tractor.

10. An apparatus according to claim 9 in which the axially outward movement of each respective ball member is limited by an annular sleeve which is arranged to hold an abutment ring in an annular groove in the respective end portion, the abutment ring being split chordally and providing an abutment surface for contact by the respective ball member to limit said axially outward movement.

11. An apparatus according to claim 1 in which the degree of bending to which the shaft can be subjected is limited by arranging an abutment member on each shaft end portion to extend axially within a bore in an adjacent movement limiting member, the amount of clearance between the abutment member and bore serving to limit the degree of bending possible.

12. An apparatus according to claim 1 in which the rotation of the shaft about its longitudinal axis is controlled by co-operating pin and slot means associated one with an adjacent portion of the tractor and the other with the shaft.

13. A tractor draft sensing apparatus including an elongated shaft having support portions for mounting in spaced fulcrum supports and end portions positioned axially outward of said support portions for mounting a pair of draft members, the arrangement being such that rearwardly extending draft forces imposed on the shaft by the draft members cause the shaft to bend, and sensing means arranged to produce a draft signal proportional to the amount of bending of the shaft, the shaft being shaped so that, considering the shaft in an unloaded condition, the neutral axis of the shaft between the support portions is displaced rearwardly of the centerline of the support portions.

* * * * *